US012077167B2

(12) United States Patent
Jo (10) Patent No.: US 12,077,167 B2
(45) Date of Patent: Sep. 3, 2024

(54) METHOD OF AUTOMATICALLY CONTROLLING VEHICLE AUTO-HOLD

(71) Applicants: HYUNDAI MOTOR COMPANY, Seoul (KR); KIA CORPORATION, Seoul (KR)

(72) Inventor: Young Jin Jo, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 383 days.

(21) Appl. No.: 17/546,445

(22) Filed: Dec. 9, 2021

(65) Prior Publication Data

US 2022/0332325 A1 Oct. 20, 2022

(30) Foreign Application Priority Data

Apr. 19, 2021 (KR) ........................ 10-2021-0050439

(51) Int. Cl.
| | | |
|---|---|---|
| *B60W 40/09* | (2012.01) | |
| *B60W 30/02* | (2012.01) | |
| *B60W 30/18* | (2012.01) | |
| *G06N 20/00* | (2019.01) | |

(52) U.S. Cl.
CPC ............ *B60W 40/09* (2013.01); *B60W 30/02* (2013.01); *B60W 30/18109* (2013.01); *G06N 20/00* (2019.01)

(58) Field of Classification Search
CPC .................................................... B60W 40/09
See application file for complete search history.

(56) References Cited

U.S. PATENT DOCUMENTS

| | | | |
|---|---|---|---|
| 2017/0043767 A1* | 2/2017 | Khafagy | ............... B60W 30/16 |
| 2020/0241545 A1* | 7/2020 | Anthony | ............... G05D 1/0088 |
| 2021/0355884 A1* | 11/2021 | Chae | ...................... B60K 35/22 |

FOREIGN PATENT DOCUMENTS

| | | | |
|---|---|---|---|
| KR | 20150064912 A | * | 6/2015 |
| KR | 10-2018-0056836 A | | 5/2018 |

* cited by examiner

*Primary Examiner* — Jaime Figueroa
*Assistant Examiner* — Jerrod Irvin Davis
(74) *Attorney, Agent, or Firm* — Morgan, Lewis & Bockius LLP (57) ABSTRACT

A method of automatically controlling vehicle auto-hold includes: collecting information on a vehicle traveling condition that applies when a driver operates a brake pedal while a vehicle is traveling; selecting learning data for learning on a pattern of a driver's operation from among pieces of the information collected in the collecting of the information on the vehicle traveling condition and storing the selected learning data; performing the learning on the pattern of the driver's operation based on the learning data and generating a categorization model for the pattern of the driver's operation according to a result of the learning; and determining whether or not to cause the auto-hold switch to enter an automatic operation mode while the vehicle is traveling, using the categorization model, and selectively causing the auto-hold switch to enter the automatic operation mode according to a result of the determining.

9 Claims, 3 Drawing Sheets

| | VEHICLE LOCATION | TRAFFIC SIGNAL | PARKING ASSISTANT SYSTEM | TRAVELING DIRECTION | GRADIENT | AUTO-HOLD SWITCH |
|---|---|---|---|---|---|---|
| COLLECTION DATA | HOUSE | X | OPERATING | BACKWARD | FLAT ROAD | OFF |
| | FREQUENTLY VISIED PLACE | X | OPERATING | FORWARD | 8% | OFF |
| | INTERSECTION | AMBER | NON-OPERATING | FORWARD | FLAT ROAD | ON |
| | INTERSECTION | GREEN | NON-OPERATING | FORWARD | FLAT ROAD | OFF |
| | GENERAL ROAD | RED | NON-OPERATING | FORWARD | 4% | ON |
| | PARKING LOT | X | OPERATING | BACKWARD | FLAT ROAD | OFF |
| | ... | ... | ... | ... | ... | ... |

METHOD OF AUTOMATICALLY CONTROLLING VEHICLE AUTO-HOLD

CROSS REFERENCE TO RELATED APPLICATION

The present application claims the benefit of priority to Korean Patent Application No. 10-2021-0050439, filed on Apr. 19, 2021 in the Korean Intellectual Property Office, the entire contents of which is incorporated herein for all purposes by this reference.

TECHNICAL FIELD

The present disclosure relates to a method of automatically controlling vehicle auto-hold and, more particularly, to a method of automatically controlling vehicle auto-hold, which is capable of maximizing the convenience of vehicle driving.

BACKGROUND

Auto-hold is an additional function of electronic stability control (ESC) constituting a vehicle brake system and is also referred to as brake auto-hold or automatic vehicle hold (AVH).

The auto-hold is a function in which although a brake pedal is depressed in a state where a vehicle is brought to a stop by pressing the brake pedal, a hydraulic braking pressure for four wheels remains held and thus the vehicle is kept at a stop. This function is performed when a driver turns on an auto-hold switch while the vehicle is traveling.

The auto-hold is operable when a gear shift stage in a transmission is a drive gear stage (D stage) or a reverse gear stage (R stage). The auto-hold stops operating when an accelerator pedal is pressed while the auto-hold is operating or when the brake pedal is pressed in a state where the auto-hold switch is turned on.

The auto-hold has an advantage in that there is no need for the driver to hold a hydraulic braking pressure and thus keep the brake pedal pressed in a situation where the vehicle is required to be kept at a stop.

However, the auto-hold disadvantageously operates only when the driver manually turns on the auto-hold switch to ensure the intention to use an auto-hold function.

The foregoing is intended merely to aid in the understanding of the background of the present disclosure, and should not be taken as acknowledgement that this information forms any part of prior art.

SUMMARY

An objective of the present disclosure is to provide a method of automatically controlling an auto-hold function without manually turning on an auto-hold switch by a driver. The method is capable of maximizing the convenience of vehicle driving.

The present disclosure is not limited to the above-described objective. Objectives other than the above-described objective would be clearly understood from the following descriptions of embodiments of the present disclosure. In addition, the objectives of the present disclosure will be accomplished by configurations and combinations of configurations, which are recited in the claims.

In order to accomplish the above-described objectives of the present disclosure, a method of automatically controlling vehicle auto-hold is set forth as follows.

According to an aspect of the present disclosure, a method of automatically controlling vehicle auto-hold may include: a first step of collecting information on a vehicle traveling condition that applies when a driver operates a brake pedal while a vehicle is traveling; a second step of selecting learning data for learning on a pattern of a driver's operation of an auto-hold switch from among pieces of the information collected in the first step and storing the selected learning data; a third step of performing the learning on the pattern of the driver's operation of the auto-hold switch based on the learning data and generating a categorization model for the pattern of the driver's operation of the auto-hold switch according to a result of the learning; and a fourth step of determining whether or not to cause the auto-hold switch to enter an automatic operation mode while the vehicle is traveling, using the categorization model for the pattern of the driver's operation of the auto-hold switch, and selectively causing the auto-hold switch to enter the automatic operation mode according to a result of the determining.

In the method, in the fourth step, in a case where a controller causes the auto-hold switch to enter the automatic operation mode, a default mode for the auto-hold switch may be preset as an off mode.

In the method, in a case where the auto-hold switch is caused to enter the automatic operation mode, a controller may determine whether or not the auto-hold switch is manually turned on by the driver.

In the method, when the auto-hold switch is not manually turned on, the controller collects in real time information preset as an input value of the categorization model for the pattern of the driver's operation of the auto-hold switch and may determine whether or not the collected information corresponds to a condition for automatically turning on the auto-hold switch, using the categorization model for the driver's operation of the auto-hold switch. In the method, when the auto-hold switch is automatically turned on and thereafter a condition for operating an auto-hold system for holding a hydraulic vehicle-braking pressure is detected, the controller may operate the auto-hold system.

In the method, when the auto-hold switch is manually turned on and thereafter the condition for operating the auto-hold system is detected, the controller may operate the auto-hold system.

In the method, when a condition for releasing the auto-hold system is detected while the auto-hold system is operating, the controller may no longer operate the auto-hold system and may automatically turn off the auto-hold switch.

In the method, in the second step, information collected at a time point at which the traveling vehicle comes to a stop may be selected as the learning data from among the pieces of the information collected in the first step.

The method may further include: a step of verifying accuracy of the categorization model for the driver's operation of the auto-hold switch between the third step and the fourth step. In the step of verifying the accuracy of the categorization model for the driver's operation of the auto-hold switch, when the accuracy of the categorization model for the driver's operation of the auto-hold switch reaches a preset target precision, the learning on the pattern of the driver's operation of the auto-hold switch may be finished.

The method may further include a step of acquiring a driver's consent to allow the auto-hold switch to enter the automatic operation mode between the third step and the fourth step.

With the above-mentioned method according to the present disclosure, the inconvenience of manually performing the auto-hold function can be reduced and the convenience of vehicle driving can be increased. Furthermore, a disadvantage with the auto-hold function can be minimized and thus the marketability of the vehicle can be enhanced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Embodiments of the present disclosure will be described in detail below with reference to the accompanying drawings. Components, features, and information in the accompanying drawings are schematically illustrated to describe the embodiments of the present disclosure in an easy-to-understand manner and thus may be different from those embodied in the real world.

Unless otherwise particularly described, the expression "include a constituent element" throughout the specification means "further may include any other constituent element, not "exclude any other constituent element".

According to an exemplary embodiment of the present disclosure, a method of automatically controlling vehicle auto-hold, which is capable of automatically operating an auto-hold function according to a real-time traveling condition without performing by a driver a separate operation for using the auto-hold function.

Auto-hold is an additional function of electronic stability control (ESC) constituting a vehicle brake system and is also referred as to automatic vehicle hold (AVH) or brake auto-hold.

The auto-hold is a function in which although a brake pedal is depressed in a state where a vehicle is brought to a stop by pressing a brake pedal, a hydraulic braking pressure for four wheels remains held and thus the vehicle is kept at a stop. This function is performed when a driver turns on an auto-hold switch while the vehicle is traveling.

The auto-hold is operable when a gear shift stage in a transmission is a drive gear stage (D stage) or a reverse gear stage (R stage). The auto-hold stops operating when an accelerator pedal is pressed while the auto-hold is operating or when the brake pedal is pressed in a state where the auto-hold switch is turned on.

The auto-hold has an advantage in that there is no need for the driver to hold the hydraulic braking pressure and thus keep the brake pedal pressed in a situation where the vehicle is required to be kept at a stop.

Usually, the driver turns on the auto-hold switch to ensure his/her intention to use the auto-hold function. That is, when intending to use the auto-hold function, the driver does so by directly pushing the auto-hold switch provided inside of the vehicle.

The method of automatically controlling vehicle auto-hold according to an exemplary embodiment of the present disclosure is capable of learning a pattern of the driver's operation of the auto-hold switch based on the condition of, and the frequency of, the driver operating the auto-hold switch to use the auto-hold function, and based on the driver's habit of operating the auto-hold switch to use the auto-hold function. Furthermore, the method is capable of automatically operating the auto-hold switch on the result of the learning without performing a separate operation.

Figure 1:
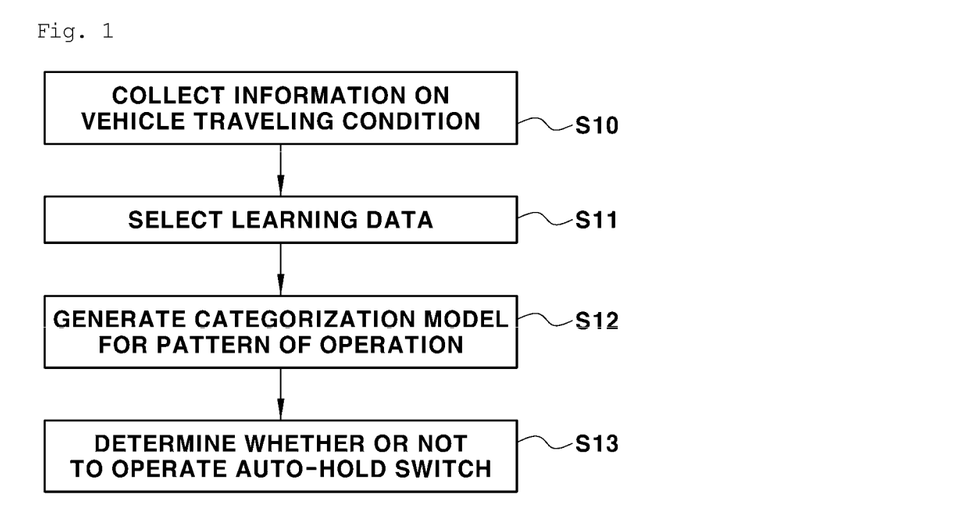
FIG. 1 is a view illustrating a method of automatically controlling vehicle auto-hold according to an exemplary embodiment of the present disclosure.

With reference to FIG. 1, the method of automatically controlling vehicle auto-hold includes: a first step S10 of collecting information on a vehicle traveling condition that applies when a driver operates a brake pedal while a vehicle is traveling; a second step S11 of selecting learning data for performing learn on a pattern of a driver's operation of an auto-hold switch from among pieces of information collected in the first step S10 and storing the selected learning data; a third step S12 of performing the learning on the pattern of the driver's operation of the auto-hold switch based on the learning data and generating a categorization model for the pattern of the driver's operation of the auto-hold switch according to a result of the learning; and a fourth step S13 of determining whether or not to cause the auto-hold switch to enter an automatic operation mode while the vehicle is traveling, using the categorization model for the pattern of the driver's operation of the auto-hold switch, and selectively causing the auto-hold switch to enter the automatic operation mode.

In addition, the method of automatically controlling vehicle auto-hold may include a step of verifying the accuracy of the categorization model of the pattern of the driver's operation of the auto-hold switch between the third step S12 and the fourth step S13.

In addition, the method of automatically controlling vehicle auto-hold may include a step of acquiring a driver's consent to allow the auto-hold switch to enter the automatic operation mode between the third step S12 and the fourth step S13, more precisely, between the step of verifying the accuracy of the categorization model for the driver's operation of the auto-hold switch and the fourth step S13.

The method of automatically controlling vehicle auto-hold according to an exemplary embodiment of the present disclosure, as is described above, may be performed by a controller. The controller may include one or more controllers mounted on the vehicle. Specifically, the controller may include a controller of a brake system inside of the vehicle. More specifically, the controller may include a controller for electronics stability control (ESC), which constitutes the brake system, but the present disclosure is not limited to this controller.

Figure 2:
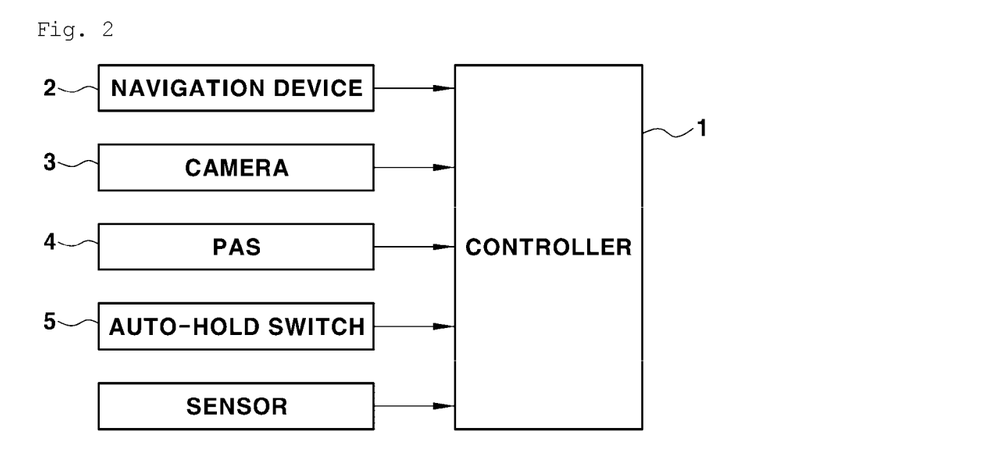
FIG. 2 is a view illustrating information necessary for the automatic control of the vehicle auto-hold according to an exemplary embodiment of the present disclosure.

With reference to FIG. 2, a controller 1 receives necessary information from a navigation device 2, a camera 3, a parking assistant system (PAS) 4, an auto-hold switch 5, and the like that are mounted on a vehicle. In addition, the controller 1 collects information, such as a vehicle traveling direction, a gradient of a road on which the vehicle travels, and a pressed or depressed state of the brake pedal, from various sensors and the like inside of the vehicle.

The navigation device 2 provides information on a vehicle location to the controller 1 in real time. The camera 3 provides image information on things in the vicinity of the vehicle to the controller 1. The image information on the things in the vicinity of the vehicle includes information on a traffic signal and the like ahead of the vehicle.

The controller 1 collects the vehicle location information along with information on whether or not an auto-hold switch 5 operates and thus determines whether or not to the auto-hold switch 5 operates according to a vehicle location. In addition, the controller 1 recognizes the frequency with which the driver operates the auto-hold switch 5 according to the vehicle location.

The traffic signal is a device that prohibits any traffic from proceeding, allows traffic to proceed in the direction denoted, and so on by turning on one of a red light, green light, and amber light that are arranged in a preset order and turning off the other two.

The controller 1 performs image pre-processing on image data provided by the camera 3 and thus distinguishably recognizes color of the light turned on among the red light, the green light, and the amber light in the traffic signal.

The controller 1 collects both image information of the camera 3 and the information on whether or not the auto-hold switch 5 operates, and thus recognizes whether or not the auto-hold switch 5 operates according to the vehicle location and a traffic-signal operation condition and recognizes the frequency with which the auto-hold switch 5 operates.

The parking assistant system (PAS) 4 is a system used to assist the driver in parking the vehicle. Using a sensor or the like installed in the front side and/or the rear side of the vehicle, the parking assistant system 4 performs a function of alerting the driver of an obstacle present in a blind spot that the driver does not recognize while parking the vehicle.

A parking assistant system (PAS) switch for operating the parking assistant system 4 is provided inside of the vehicle. When intending to use the parking assistant system 4, the user turns on the PAS switch.

The controller 1 recognizes the driver's intention to park the vehicle through the information on whether or not the parking assistant system 4 operates, which is received from the parking assistant system 4. Specifically, when the PAS switch is turned on or is in a turned-on state, the parking assistant system 4 transfers to the controller 1 information on whether or not the parking assistant system 4 operates.

The controller 1 collects both the information on whether or not the parking assistant system 4 operates and the information on whether or not the auto-hold switch 5 operates, and thus determines whether or not the auto-hold function is used in the condition that the driver operates the parking assistant system 4 while parking the vehicle.

In addition, when the driver manually operates the auto-hold switch 5, the controller 1 receives an operation signal of the auto-hold switch 5 and recognizes the driver's habit of using the auto-hold function and the frequency with which the driver uses the auto-hold function, based on the operation signal of the auto-hold switch 5.

In addition, the controller 1 collects information on a vehicle traveling condition, such as a vehicle traveling direction, a gradient of a road on which the vehicle travels, and a pressed or depressed state of the brake pedal. For collecting, the controller 1 receives the information on the vehicle traveling condition from a detection unit detecting the information on the vehicle traveling condition or an acquisition unit acquiring the information on the vehicle traveling condition. Examples of the detection unit or the acquisition unit include a sensor, a controller, and the like installed inside of the vehicle.

The controller 1 collects and stores various pieces of information necessary to perform learning on the pattern of the driver's operation of the auto-hold switch 5, each time the brake pedal operates. Specifically, the controller 1 collects and stores information on a gear-shift lever position, information on a distance to a preceding vehicle, and the like. The controller 1 stores in a built-in memory and the like information that is collected each time the brake pedal operates.

When storing pieces of collection information, the controller 1 does so in such a manner that the pieces of collection information are linked with each other based on points in time at which the piece of collection information are collected. That is, the controller 1 stores the collected piece of information that are collected each time the brake pedal operates, in such a manner as to be linked with each other.

Figure 3:
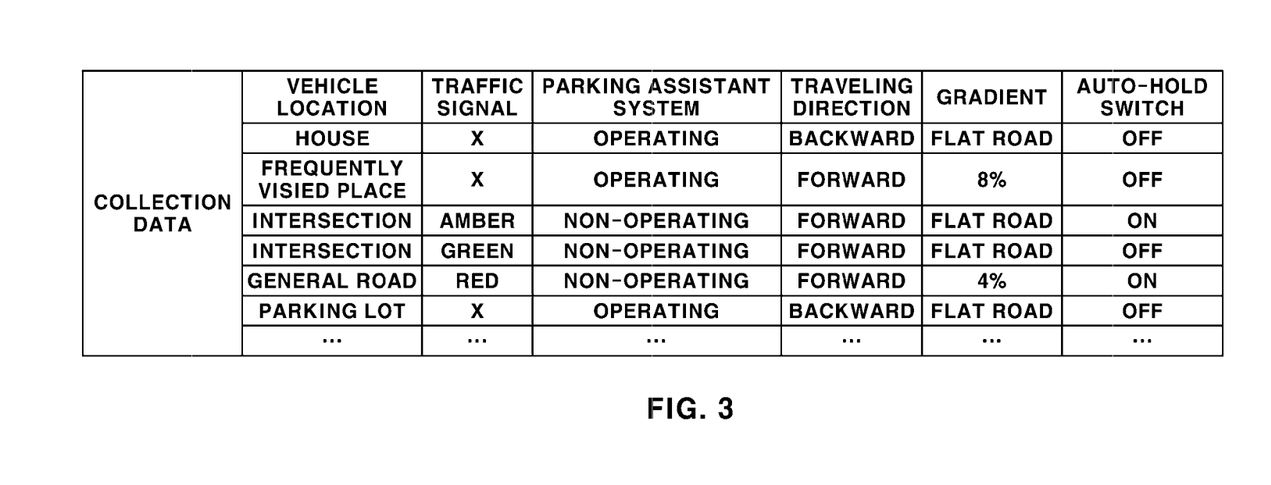
FIG. 3 is a view illustrating information collected for the automatic control of the vehicle auto-hold according to an exemplary embodiment of the present disclosure.

With reference to FIG. 3, the controller 1 stores the information on the vehicle location, traffic-signal color information, information on whether or not the parking assistant system 4 operates, traveling direction information, the gradient of the road on which the vehicle travels, information on whether or not the auto-hold switch 5 operates, and the like in such a manner as to be linked with each other. For example, for storing, the controller 1 categorizes pieces of information on the vehicle location into information on houses, information on frequently visited places, information on intersections, information on general roads, information parking lots, and the like. In addition, the controller 1 also stores distinguishably information on whether or not the traffic signal is present at the vehicle location, and distinguishably stores the information on whether or not the parking assistant system 4 operates.

The controller 1 performs learning on the pattern of the driver's operation of the auto-hold switch 5 based on the pieces of collection information that are collected and are stored each time the brake pedal operates.

Before performing the learning, the controller 1 selects learning data for processing the collection information and performing the learning on the processed collection information.

Specifically, the controller 1 selects and stores information (hereinafter referred to "first information") that is collected at a time point at which the traveling vehicle comes to a stop after reducing a speed, as the learning data, among the pieces of collection information. At this point, the controller 1 secures acquisition of a plurality of pieces of learning data. For example, the controller 1 secures and stores N pieces of learning data. N is a natural number.

The first information includes: information on a gradient of a road on which the vehicle is located at a time point (hereinafter referred to as a "first time point") at which the traveling vehicle comes to a stop; information on the gear-shift lever position, information on whether or not the auto-hold switch 5 operates, and information on whether or not the parking assistant system 4 operates, at the first time point; and information on the distance to the preceding vehicle at the first time point. In addition, the first information includes: information on the vehicle location at the first time point; and traffic situation information on the road on which the vehicle is located and color information on a traffic signal ahead of the vehicle, at the first time point.

As known, according to the gear-shift lever position, the gear shift stage in the transmission is changed to a reverse gear stage R, a neutral gear stage N, a drive gear stage D, a parking gear stage P, or the like. The traffic situation information on the road is categorized into information on a congested road, information on a clear road, and the like.

The controller 1 analyzes a pattern of a driver's operation of the auto-hold switch 5 by perform the learning that uses the learning data and generates the categorization model for the driver's operation of the auto-hold switch 5 based on a result of the analysis.

At this point, the controller 1 sets up the categorization model for the driver's operation of the auto-hold switch 5 by performing general machine learning. That is, the controller 1 performs the machine learning based on a plurality of pieces of learning data, which are selected from among the pieces of collection information, and thus generates the categorization model for the driver's operation of the auto-hold switch 5.

Specifically, the controller 1 analyzes and estimates the probability that the driver will operate the auto-hold switch 5 in a predetermined vehicle traveling condition, based on the learning data. For example, the controller 1 performs learning on the probability that the driver will turn on the auto-hold switch 5 in the predetermined vehicle traveling condition included in each of the pieces of learning data, using a categorization algorithm for supervised learning that is one method for the machine learning.

Then, the controller 1 performs categorization into cases where the auto-hold switch 5 operates (hereinafter referred to as "operating cases") and cases where the auto-hold switch 5 does not operate (hereinafter referred to as "non-operating cases") where the auto-hold switch 5 does not operate, according to the vehicle traveling condition for each of the pieces of the learning data, based on the probability that the auto-hold switch will operate.

In addition, the controller 1 sets up the categorization model for the driver's operation of the auto-hold switch 5, which determines the pattern of the driver's operation of the auto-hold switch 5, based on a result of the categorization into the operating cases and the non-operating cases according to the vehicle traveling condition for each of the pieces of learning data. The categorization model for the driver's operation of the auto-hold switch 5 is set up in such a manner as to determine whether or not to operate the auto-hold switch 5, according to the vehicle traveling condition.

More specifically, the controller 1 infers and generates a categorization function for generalizing the pattern of the driver's operation of the auto-hold switch 5, based on the result of categorizing the pieces of learning data into the operating cases and the non-operating cases. Then, the categorization model for the driver's operation of the auto-hold switch 5 is set up in such a manner as to determine whether or not to operate the auto-hold switch 5, according to the vehicle traveling condition based on the categorization function.

Accordingly, the controller 1 determines whether or not to operate the auto-hold switch 5 according to a real-time vehicle traveling condition, using the categorization model for the driver's operation of the auto-hold switch 5.

In addition, the controller 1 verifies the accuracy of the categorization model for the driver's operation of the auto-hold switch 5 using the information on the vehicle traveling condition, which is collected after setting up the categorization model for the driver's operation of the auto-hold 5, as test data.

Specifically, the controller 1 collects a plurality of pieces of information on the vehicle traveling condition, as the text data, after setting up the categorization model for the driver's operation of the auto-hold 5. For example, the controller 1 collects M pieces of test data. M is a natural number. One piece of information on the vehicle traveling condition includes vehicle state information and information on a condition on things in the vicinity of the vehicle, which are collected at the first time point at which the brake pedal of the traveling vehicle operates. The vehicle state information includes the information on the gear-shift lever position, the information on whether or not the auto-hold switch 5 operates, the information on whether or not the parking assistant system 4 operates, the information on the vehicle location, and the color information on the traffic signal, at the first time point. The information on the condition for things in the vicinity of the vehicle includes the information on the gradient of the road on which the vehicle is located at the first time point.

In order to verify the accuracy of the categorization model for the driver's operation of the auto-hold switch 5, the controller 1 assumes that among the pieces of test data, the information on whether or not the auto-hold switch 5 operates is "output information" and assumes that information other than the output information is "input information". The controller 1 determines whether or not to operate the auto-hold switch 5 with respect to the input information, using the categorization model for the driver's operation of the auto-hold switch 5. The controller 1 verifies the accuracy of the categorization model for the driver's operation based on a result of comparing the information on whether or not to operate the auto-hold switch 5, which is determined using the categorization model for the driver's operation, with the output information.

Specifically, when the categorization model for the driver's operation of the auto-hold switch 5 outputs the output information as an output value with respect to the input information, the controller 1 determines that the output value of the categorization model for the driver's operation of the auto-hold switch 5 is accurate. In addition, when the output value that is output with respect to the input information by the categorization model for the driver's operation of the auto-hold switch 5 is different from the output value, the controller 1 determines that the output value of the categorization model for the driver's operation of the auto-hold switch 5 is not accurate.

The controller 1 repeatedly performs a verification process, as described above, on a plurality of pieces of test data and determines whether or not the categorization model for the driver's operation of the auto-hold switch 5 achieves a preset target accuracy (k %). The controller 1 continuously performs additional learning on the pattern of the driver's operation of the auto-hold switch 5 until the target accuracy of (k %) is reached and thus can correct the categorization model for the driver's operation of the auto-hold switch 5 until the accuracy of the categorization model for the driver's operation of the auto-hold switch 5 reaches the target accuracy (k %) or exceeds the target accuracy (k %).

When the accuracy of the categorization model for the driver's operation of the auto-hold switch 5 reaches the target accuracy (k %), the controller 1 finishes the correcting of the categorization model for the driver's operation of the auto-hold switch 5 and the performing of the learning on the pattern of the driver's operation of the auto-hold switch 5.

When finishing the learning on the pattern of the driver's operation of the auto-hold switch 5, the controller 1 selectively activates the automatic operation mode for the auto-hold switch 5.

In other words, when finishing the correction of the categorization model for the driver's operation of the auto-hold switch 5, the controller 1 obtains a driver's consent to allow the auto-hold switch 5 to enter the automatic operation mode. For example, the controller 1 determines whether or not to cause the auto-hold switch 5 to enter the automatic operation mode, according to a driver's setting that uses a user setting mode (USM) function of the vehicle.

When the driver allows the auto-hold switch 5 to enter the automatic operation mode, the controller 1 sets a default mode for the auto-hold switch 5 to an off mode that is a non-operating mode.

When the auto-hold switch 5 finishing entering the automatic operation mode, the controller 1 determines whether or not to operate the auto-hold switch 5, according to the real-time vehicle traveling condition, using the categorization model for the driver's operation of the auto-hold switch 5, and selectively turns on the auto-hold switch 5 or maintains a turned-off state.

After the auto-hold switch is caused to enter the automatic operation mode, when predetermined information preset as the input value of the categorization model for the driver's operation of the auto-hold switch 5 is detected, the controller 1 predicts in real time the driver's intention to operate the auto-hold switch 5, based on the detected information and determines whether or not to operate the auto-hold switch 5. The controller 1 controls the operation of the auto-hold switch 5 according to a result of determining whether or not to operate the auto-hold switch 5 using the categorization model for the driver's operation of the auto-hold switch 5. The controller 1 turns on or turns off the auto-hold switch 5 according to the result of the determining using the categorization model for the driver's operation of the auto-hold switch 5.

According to an exemplary embodiment of the present disclosure, as described above, the convenience of vehicle driving can be increased by automatically turning on or turning off the auto-hold switch 5 based on a result of performing the learning on the pattern of the driver's operation of the auto-hold switch 5.

Figure 4:
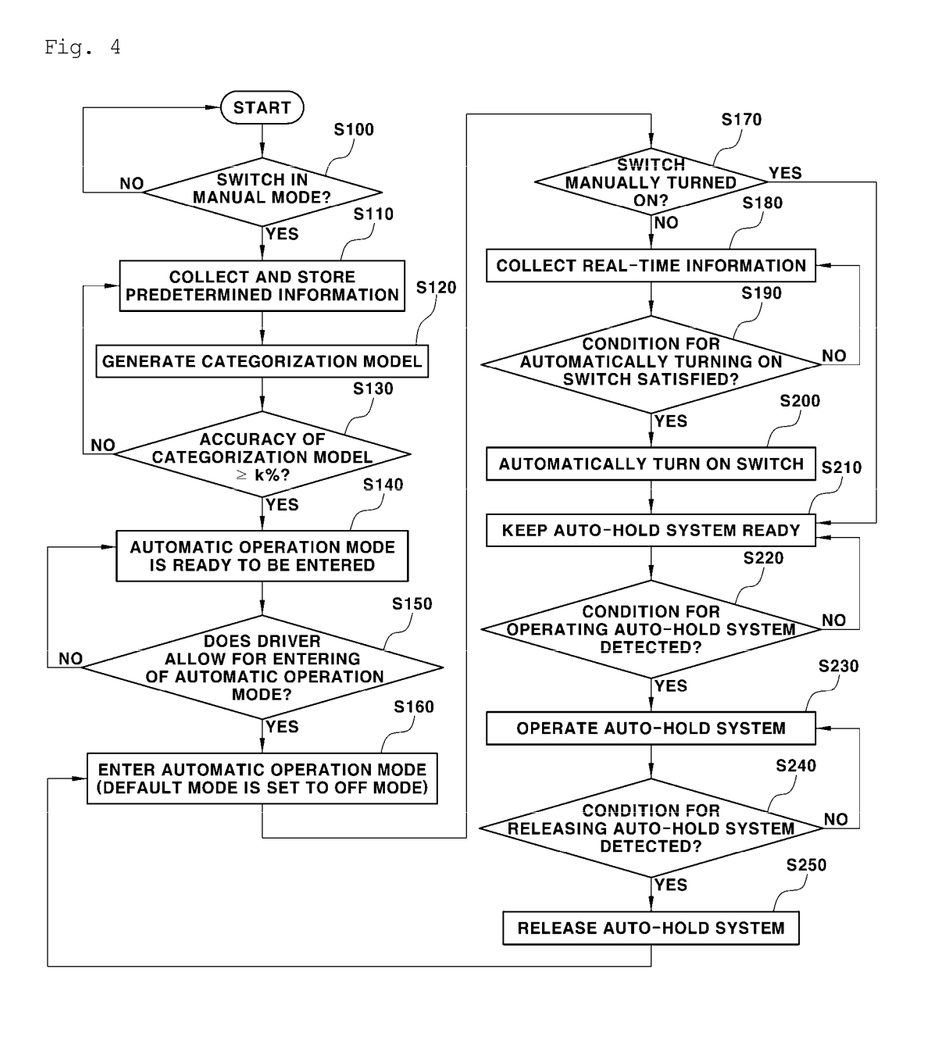
FIG. 4 is a flowchart illustrating the method of automatically controlling vehicle auto-hold according to an exemplary embodiment of the present disclosure.

FIG. 4 is a flowchart illustrating the method of automatically controlling vehicle auto-hold according to an exemplary embodiment of the present disclosure. The present disclosure is not necessarily limited to order of steps in FIG. 4.

With reference to FIG. 4, the controller 1 determines whether or not the auto-hold switch 5 is in a manual mode in a state where an engine of the vehicle is started (S100). When in the manual mode, the auto-hold switch 5 is turned on or turned off by the driver.

When the auto-hold switch 5 is in the manual mode and the gear shift stage in the transmission is the drive gear stage or the reverse gear stage, and while the brake pedal is operating at or above a preset reference hydraulic pressure, the controller 1 collects and stores predetermined information on the vehicle traveling condition in order to perform the learning on the pattern of the driver's operation of the auto-hold switch 5 (S110).

The controller 1 performs the learning on the pattern of the driver's switch operation of the auto-hold switch 5 based on the collected information on the vehicle traveling condition and generates and sets up the categorization model for the driver's operation of the auto-hold switch 5 for determining whether or not to operate the auto-hold switch 5 (S120). The categorization model for the driver's operation of the auto-hold 5 is a model that is set up to predict the driver's intention to operate the auto-hold switch 5 and thus to determine whether or not to operate the auto-hold switch 5.

The controller 1 verifies the set-up categorization model for the driver's operation of the auto-hold switch 5 and determines whether or not the accuracy of the categorization model for the driver's operation of the auto-hold switch 5 is equal to or higher than the preset target accuracy (k %) (S130).

When the accuracy of the categorization model for the driver's operation of the auto-hold switch 5 is lower than the target accuracy (k %), the controller 1 corrects the categorization model through the additional learning and regenerates the categorization model for the driver's operation of the auto-hold switch 5. When the accuracy of the categorization model for the driver's operation of the auto-hold switch 5 is equal to or higher than the target accuracy (k %), the controller 1 finishes the performing of the learning on the pattern of the driver's switch operation of the auto-hold switch 5.

After finishing the performing of the learning on the pattern of the driver's operation of the auto-hold switch 5, but before causing the auto-hold switch 5 to enter the automatic operation mode, the controller 1 causes the auto-hold switch 5 to enter a ready mode in which a driver's approval is sought (S140).

The controller 1 determines whether or not the auto-hold switch 5 is allowed by the driver's setting to enter the automatic operation mode (S150). For example, through the user setting mode (USM) function of the vehicle, the driver allows the auto-hold switch 5 to enter the automatic operation mode.

When the auto-hold switch 5 is allowed to enter the automatic operation mode, the controller 1 causes the auto-hold switch 5 to enter the automatic operation mode (S160). When the auto-hold switch 5 is caused to enter the automatic operation mode, the controller 1 determines the off mode for the auto-hold switch 5, as the default mode.

The controller 1 determines whether or not to operate the auto-hold switch 5, preferentially according to a driver's manual operation rather than according to the automatic operation mode for the auto-hold switch 5.

Therefore, the controller 1 determines whether or not the auto-hold switch 5 is manually turned on by the driver (S170). When the auto-hold switch 5 is manually turned on, regardless of the real-time vehicle traveling condition, the controller 1 keeps a system (hereinafter referred to as an "auto-hold system") for performing the auto-hold function of the vehicle, ready (S210). Then, after a condition for operating the auto-hold system is detected, the controller 1 operates the auto-hold system (S230).

In addition, when the auto-hold switch 5 is not manually turned on, the controller 1 collects in real time the information on the vehicle traveling condition preset as the input value of the categorization model for the driver's operation of the auto-hold switch 5 (S180).

The controller 1 determines whether or not the information on the vehicle traveling condition, which is collected in Step S180, corresponds to a condition for automatically turning on the auto-hold switch 5, using the categorization model for the driver's operation of the auto-hold switch 5 (S190).

When determining that information collected in Step S190 does not correspond to a condition for turning on the auto-hold switch 5, the controller 1 continuously collects the information on the vehicle traveling condition in real time (S180). When determining that the information collected in Step S190 corresponds to the condition for turning on the auto-hold switch 5, the controller 1 automatically turns on the auto-hold switch 5 (S200).

When turning on the auto-hold switch 5, the controller 1 causes the auto-hold system to enter a ready state (S210).

The auto-hold system may be the electronic stability control (ESC) that is mounted on the vehicle.

After turning on the auto-hold switch 5, the controller 1 determines whether or not the condition for operating the auto-hold system is detected (S220). When detecting the condition for operating the auto-hold system, the controller 1 operates the auto-hold system and thus activates the auto-hold function (S230). When not detecting the condition for operating the auto-hold system, the controller 1 keeps the auto-hold system in the ready state (S210).

The condition for operating the auto-hold system is required to occur in the ready state or a released state of the auto-hold system. The condition for operating the auto-hold system includes the condition that the gear shift stage in the transmission is one of the drive gear stage, the reverse gear stage, and the neutral gear stage (N stage), the condition that the brake pedal operates at or above the preset reference hydraulic pressure, and the condition that the auto-hold switch 5 is turned on. When the auto-hold system operates, although the driver releases the brake pedal, the hydraulic braking pressure on vehicle wheels is held and thus the vehicle is kept at a stop.

In addition, the controller 1 determines whether or not the condition for releasing the auto-hold system occurs while the auto-hold system is operating (S240).

While the auto-hold system is operating, when the condition for releasing the auto-hold system does not occur, the controller 1 keeps the auto-hold system operating. While the auto-hold system is operating, when the condition for releasing the auto-hold system occurs, the controller 1 no longer operates the auto-hold system (S250).

The condition for releasing the auto-hold system in a state where the auto-hold switch 5 enters the automatic operation mode is that the accelerator pedal operates in a manner that exceeds a preset reference degree of throttle opening in a state where the auto-hold system operates.

When the auto-hold system no longer operates, the controller 1 restores the auto-hold switch 5 to the default mode (S160). In other words, in a case where the auto-hold switch 5 is caused to enter the automatic operation mode, when the auto-hold system no longer operates after released, the controller 1 automatically turns off the auto-hold switch 5.

In a case where the auto-hold switch 5 is manually caused by the driver to be turned on, when the accelerator pedal or the brake pedal operates in a state where the auto-hold switch 5 is turned off by the driver, the controller 1 no longer operates the auto-hold system.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of automatically controlling vehicle auto-hold, the method comprising:
   collecting information on a vehicle traveling condition that applies when a driver operates a brake pedal while a vehicle is traveling;
   selecting learning data for learning on a pattern of a driver's operation of an auto-hold switch from among pieces of the information collected in the collecting of the information on the vehicle traveling condition, and storing the selected learning data;
   performing the learning on the pattern of the driver's operation of the auto-hold switch based on the learning data and generating a categorization model for the pattern of the driver's operation of the auto-hold switch according to a result of the learning; and
   determining whether or not to cause the auto-hold switch to enter an automatic operation mode while the vehicle is traveling, using the categorization model for the pattern of the driver's operation of the auto-hold switch, and selectively causing the auto-hold switch to enter the automatic operation mode according to a result of the determining,
   wherein in a case where the auto-hold switch is caused to enter the automatic operation mode, a controller determines whether or not the auto-hold switch is manually turned on by the driver, and
   wherein when the auto-hold switch is not manually turned on, the controller collects in real time information preset as an input value of the categorization model for the pattern of the driver's operation of the auto-hold switch and determines whether or not the collected information corresponds to a condition for automatically turning on the auto-hold switch, using the categorization model for the driver's operation of the auto-hold switch.

2. The method of claim 1, wherein in the determining of whether or not to cause the auto-hold switch to enter the automatic operation mode, in a case where the controller causes the auto-hold switch to enter the automatic operation mode, a default mode for the auto-hold switch is preset as an off mode.

3. The method of claim 1, wherein when the auto-hold switch is automatically turned on and thereafter a condition for operating an auto-hold system for holding a hydraulic vehicle-braking pressure is detected, the controller operates the auto-hold system.

4. The method of claim 3, wherein when the auto-hold switch is manually turned on and thereafter the condition for operating the auto-hold system is detected, the controller operates the auto-hold system.

5. The method of claim 3, wherein when a condition for releasing the auto-hold system is detected while the auto-hold system is operating, the controller no longer operates the auto-hold system and automatically turns off the auto-hold switch.

6. The method of claim 1, wherein in the selecting of the learning data, information collected at a time point at which the traveling vehicle comes to a stop is selected as the learning data from among the pieces of the information collected in the collecting of the information on the vehicle traveling condition.

7. The method of claim 1, further comprising:
   verifying accuracy of the categorization model for the driver's operation of the auto-hold switch, between the performing of the learning on the pattern of the driver's operation of the auto-hold switch and the determining of whether or not to cause the auto-hold switch to enter the automatic operation mode,
   wherein in the verifying of the accuracy of the categorization model for the driver's operation of the auto-hold switch, when the accuracy of the categorization model for the driver's operation of the auto-hold switch reaches a preset target precision, the learning on the pattern of the driver's operation of the auto-hold switch is finished.

8. The method of claim 1, further comprising:
   acquiring a driver's consent to allow the auto-hold switch to enter the automatic operation mode, between the performing of the learning on the pattern of the driver's operation of the auto-hold switch and the determining of whether or not to cause the auto-hold switch to enter the automatic operation mode.

9. A method of automatically controlling vehicle auto-hold, the method comprising:
  collecting information on a vehicle traveling condition that applies when a driver operates a brake pedal while a vehicle is traveling;
  selecting learning data for learning on a pattern of a driver's operation of an auto-hold switch from among pieces of the information collected in the collecting of the information on the vehicle traveling condition, and storing the selected learning data;
  performing the learning on the pattern of the driver's operation of the auto-hold switch based on the learning data and generating a categorization model for the pattern of the driver's operation of the auto-hold switch according to a result of the learning, the categorization model being generated based on categorization into first cases where the auto-hold switch operates and second cases where the auto-hold switch does not operate; and
  determining whether or not to cause the auto-hold switch to enter an automatic operation mode while the vehicle is traveling, using the categorization model for the pattern of the driver's operation of the auto-hold switch, and selectively causing the auto-hold switch to enter the automatic operation mode according to a result of the determining.

* * * * *